United States Patent
Christopher et al.

(10) Patent No.: US 6,900,845 B1
(45) Date of Patent: May 31, 2005

(54) MEMORY ARCHITECTURE FOR A MULTIPLE FORMAT VIDEO SIGNAL PROCESSOR

(75) Inventors: Todd Christopher, Indianapolis, IN (US); Barth Alan Canfield, Indianapolis, IN (US); Steven Wayne Patton, Littleton, CO (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 844 days.

(21) Appl. No.: 09/319,822

(22) PCT Filed: Dec. 15, 1997

(86) PCT No.: PCT/US97/22854

§ 371 (c)(1),
(2), (4) Date: Jun. 11, 1999

(87) PCT Pub. No.: WO98/27721

PCT Pub. Date: Jun. 25, 1998

(30) Foreign Application Priority Data

Dec. 18, 1996 (EP) .......................... 964027858

(51) Int. Cl.[7] ................................. H04N 7/01
(52) U.S. Cl. ................... 348/445; 348/446; 375/240.25
(58) Field of Search ................ 348/443, 445, 348/474, 446; 375/240.01, 240.13, 240.16, 240.25

(56) References Cited

U.S. PATENT DOCUMENTS 5,448,300 A    9/1995  Yamada et al. ............. 348/571
5,754,248 A  * 5/1998  Faroudja ..................... 348/474

FOREIGN PATENT DOCUMENTS

| EP | 0707426 A2 | 4/1966 | |
|---|---|---|---|
| EP | 0572766 A2 | 8/1993 | |
| EP | 0574901 | 12/1993 | ............ H04N/5/46 |
| EP | 0766462 | 4/1997 | ............ H04N/5/44 |
| JP | 5-292423 | 11/1993 | ............ H04N/5/46 |
| JP | 8-98105 | 4/1996 | ............ H04N/5/46 |
| JP | 408098105 A | * 4/1996 | |

OTHER PUBLICATIONS

Copy of search report attached, Patent Abstracts of Japan, vol. 096, No. 008, Aug. 30, 1996 & J 08–098105.
**Patent Abstracts of Japan, vol. 018, No. 088, Feb. 14, 1994, JP 05–292423.
D. Gillies et al, "Combined TV Format Conrol and Sampling Rate Conversion IC", Aug. 1, 1994 IEEE Transactions on Consumer Electronics, vol. 40, Nr. 3, pp. 711–716.

* cited by examiner

Primary Examiner—Jeffery Hofsass
Assistant Examiner—George A Bugg
(74) Attorney, Agent, or Firm—Joseph S. Tripoli; Joseph J. Laks; Ronald H. Kurdyla (57) ABSTRACT

A video decoder transcodes video data from various input formats to a predetermined output format. Input data may be standard definition data or MPEG2 compressed data. Standard definition data are rearranged into block format to be compatible with the decoder's single display processor. The display processor selectively processes and conveys either MPEG2 format data or non-MPEG2 format data to a display device. A block based frame memory stores MPEG2 and non-MPEG2 pixel block data, as well as standard definition data in raster line format during processing.

14 Claims, 12 Drawing Sheets

| ROW A | Y1 | U1 | Y2 | V2 | Y3 | U3 | Y4 | V4 | Y5 | U5 | Y6 | V6 | ... | Y719 | U719 | Y720 | V720 |
|---|---|---|---|---|---|---|---|---|---|---|---|---|---|---|---|---|---|
| ROW B | Y1 | U1 | Y2 | V2 | Y3 | U3 | Y4 | V4 | Y5 | U5 | Y6 | V6 | ... | Y719 | U719 | Y720 | V720 |
| ROW C | Y1 | U1 | Y2 | V2 | Y3 | U3 | Y4 | V4 | Y5 | U5 | Y6 | V6 | ... | Y719 | U719 | Y720 | V720 |
| ROW D | Y1 | U1 | Y2 | V2 | Y3 | U3 | Y4 | V4 | Y5 | U5 | Y6 | V6 | ... | Y719 | U719 | Y720 | V720 |
| ROW E | Y1 | U1 | Y2 | V2 | Y3 | U3 | Y4 | V4 | Y5 | U5 | Y6 | V6 | ... | Y719 | U719 | Y720 | V720 |
| ROW F | Y1 | U1 | Y2 | V2 | Y3 | U3 | Y4 | V4 | Y5 | U5 | Y6 | V6 | ... | Y719 | U719 | Y720 | V720 |
| ROW G | Y1 | U1 | Y2 | V2 | Y3 | U3 | Y4 | V4 | Y5 | U5 | Y6 | V6 | ... | Y719 | U719 | Y720 | V720 |
| ROW H | Y1 | U1 | Y2 | V2 | Y3 | U3 | Y4 | V4 | Y5 | U5 | Y6 | V6 | ... | Y719 | U719 | Y720 | V720 |
| ROW I | Y1 | U1 | Y2 | V2 | Y3 | U3 | Y4 | V4 | Y5 | U5 | Y6 | V6 | ... | Y719 | U719 | Y720 | V720 |
| ROW J | Y1 | U1 | Y2 | V2 | Y3 | U3 | Y4 | V4 | Y5 | U5 | Y6 | V6 | ... | Y719 | U719 | Y720 | V720 |
| ROW K | Y1 | U1 | Y2 | V2 | Y3 | U3 | Y4 | V4 | Y5 | U5 | Y6 | V6 | ... | Y719 | U719 | Y720 | V720 |
| ROW L | Y1 | U1 | Y2 | V2 | Y3 | U3 | Y4 | V4 | Y5 | U5 | Y6 | V6 | ... | Y719 | U719 | Y720 | V720 |

| ROW A | Y1 | Y2 | Y3 | Y4 | Y5 | Y6 | Y7 | Y8 |
|---|---|---|---|---|---|---|---|---|
| ROW B | Y1 | Y2 | Y3 | Y4 | Y5 | Y6 | Y7 | Y8 |
| ROW C | Y1 | Y2 | Y3 | Y4 | Y5 | Y6 | Y7 | Y8 |
| ROW D | Y1 | Y2 | Y3 | Y4 | Y5 | Y6 | Y7 | Y8 |
| ROW E | Y1 | Y2 | Y3 | Y4 | Y5 | Y6 | Y7 | Y8 |
| ROW F | Y1 | Y2 | Y3 | Y4 | Y5 | Y6 | Y7 | Y8 |
| ROW G | Y1 | Y2 | Y3 | Y4 | Y5 | Y6 | Y7 | Y8 |
| ROW H | Y1 | Y2 | Y3 | Y4 | Y5 | Y6 | Y7 | Y8 |

| ROW A | U1 | U3 | U5 | U7 |
|---|---|---|---|---|
| ROW C | U1 | U3 | U5 | U7 |
| ROW E | U1 | U3 | U5 | U7 |
| ROW G | U1 | U3 | U5 | U7 |

| ROW A | V2 | V4 | V6 | V8 |
|---|---|---|---|---|
| ROW C | V2 | V4 | V6 | V8 |
| ROW E | V2 | V4 | V6 | V8 |
| ROW G | V2 | V4 | V6 | V8 |

| ROW A | Y9 | Y10 | Y11 | Y12 | Y13 | Y14 | Y15 | Y16 |
|---|---|---|---|---|---|---|---|---|
| ROW B | Y9 | Y10 | Y11 | Y12 | Y13 | Y14 | Y15 | Y16 |
| ROW C | Y9 | Y10 | Y11 | Y12 | Y13 | Y14 | Y15 | Y16 |
| ROW D | Y9 | Y10 | Y11 | Y12 | Y13 | Y14 | Y15 | Y16 |
| ROW E | Y9 | Y10 | Y11 | Y12 | Y13 | Y14 | Y15 | Y16 |
| ROW F | Y9 | Y10 | Y11 | Y12 | Y13 | Y14 | Y15 | Y16 |
| ROW G | Y9 | Y10 | Y11 | Y12 | Y13 | Y14 | Y15 | Y16 |
| ROW H | Y9 | Y10 | Y11 | Y12 | Y13 | Y14 | Y15 | Y16 |

| ROW A | U9 | U11 | U13 | U15 |
|---|---|---|---|---|
| ROW C | U9 | U11 | U13 | U15 |
| ROW E | U9 | U11 | U13 | U15 |
| ROW G | U9 | U11 | U13 | U15 |

| ROW A | V10 | V12 | V14 | V16 |
|---|---|---|---|---|
| ROW C | V10 | V12 | V14 | V16 |
| ROW E | V10 | V12 | V14 | V16 |
| ROW G | V10 | V12 | V14 | V16 |

MEMORY ARCHITECTURE FOR A MULTIPLE FORMAT VIDEO SIGNAL PROCESSOR

FIELD OF THE INVENTION

This invention relates to processing video signals for display.

BACKGROUND INFORMATION

Compressed video signal transmission systems, for example systems using an MPEG2 (Motion Picture Experts Group) compression format ("Coding of Moving Pictures and Associated Audio," ISO/IEC JTC1/SC29/WG11 N0702 (revised), May 10, 1994), are currently broadcasting HDTV (High Definition Television) digital signals from a number of test sites. Commercial program broadcasts are scheduled to begin soon as the first HDTV sets come to market. HDTV signals are not compatible with current television receivers, such as those for processing NTSC standard signals in the United States. Therefore, a transition period will occur during which SD (standard definition) television signals according to the NTSC or PAL television standards will continue to be broadcast so as to prevent SD sets from becoming immediately obsolete. Also for a period of time, some programming will not be available in MPEG2 format because of changeover logistics broadcasters will encounter.

Video data is transmitted in different formats (e.g. 4:3 and 16:9 picture display aspect ratios; 4:4:4, 4:2:2, and 4:2:0 data sample formats; interlaced and non-interlaced scanned) and with different spatial resolution (e.g. 352, 480, 544, 640, 720 . . . 1920 pixels per line and 240, 480, 720, 1080 active lines per frame). It is generally impractical, for both aesthetic and cost reasons, to equip video signal receivers with the ability to display decompressed signals in their pre-transmission format. Rather, post decompression processing circuitry is preferably included to transcode different formats of a decompressed video signal to a desired display format.

There are many transcoding or spatio-temporal conversion systems known to those skilled in the art of video signal processing. In general, each is directed to a specific type of conversion, such as interlace to non-interlace conversion, or sample, line, or field rate doubling.

Even though video decompression systems incorporate an appreciable amount of circuitry, it is desirable to employ additional circuitry to process non-compressed or standard definition video signals. Post processing circuitry included in the receiver should transcode an SD video signal without significantly increasing the amount of transcoding circuitry. This is difficult because digital MPEG2 formatted television signals arrive at an MPEG2 compatible display processor in decoded pixel block format. SD television signals generally arrive at the display processor as multiplexed analog $YC_RC_B$ display-ready pixel lines (a raster scan) in a 4:2:2 ratio in either NTSC or PAL format. Also, SD signals are of lower resolution than many of the high definition (HD) displays associated with MPEG2 HD signals. Upconversion which correctly compensates for motion occurring in an image is a complex process because the image is presented temporally as interlaced field data. Significant memory is required to construct an image frame suitable for display.

SUMMARY

In accordance with the present invention, a digital video signal processing system receives both MPEG2 compatible data and non-MPEG2 compatible data. A display processor including a block-to-line converter for processing block format MPEG2 data and line-to-block converted non-MPEG2 format data receives digital video data. A common memory stores MPEG2 format data and non-MPEG2 format data during processing by said system.

BRIEF DESCRIPTION OF THE DRAWINGS

FIG. 3 illustrates an example of line-to-block conversion.

FIG. 4, and FIGS. 5A and 5B through 8A and 8B illustrate various signal format conversions implemented by the decoder circuit.

DESCRIPTION OF THE PREFERRED EMBODIMENT

Figure 1:
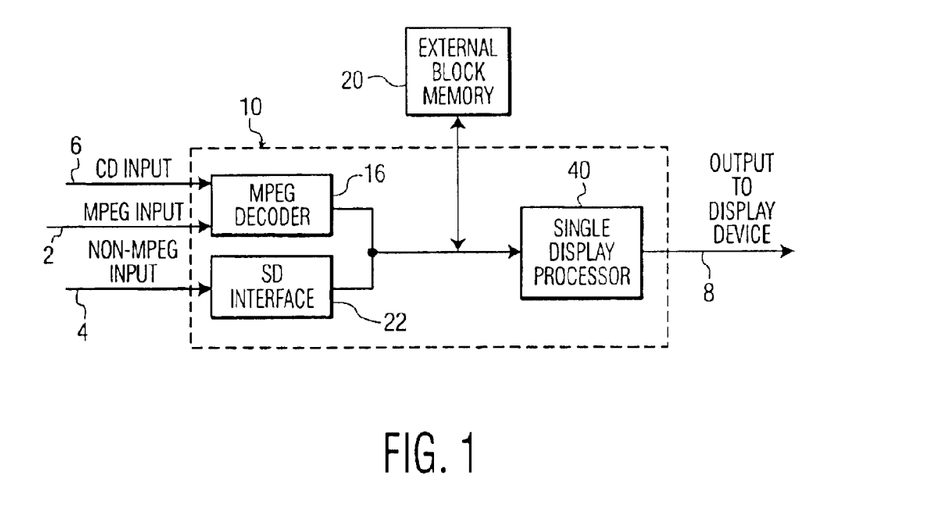
FIG. 1 is a block diagram of an embodiment of the present invention.

FIG. 1 illustrates the basic elements of the preferred embodiment of the invention.

Compressed MPEG2 data from compressed data (CD) Input and from MPEG2 Input provide compressed MPEG2 data to MPEG2 Decoder 16. MPEG2 data may be any type data compressed and transmitted within the guidelines of the MPEG2 standard. This includes, for example, high definition data and standard definition data. Decoded MPEG2 data is provided to Block Memory 20 and from there to display processor 40. Non-MPEG2, standard definition data, for example, CCIR 601 formatted video data, is received by SD Interface 22 which accepts line data and converts it to block data. Block Memory 20 receives standard definition (SD) data in block format from SD Interface 22 and provides it as needed to the same display processor 40. Display processor 40 receives block data via memory 20 from both sources and provides block-to-line conversion and aspect and ratio conversion formatted to a desired display device.

The bus structure between elements 16, 20, 22, and 40 may be a common bus as shown, or separate buses connecting each of elements 16, 22 and 40 to element 20.

Figure 2A:
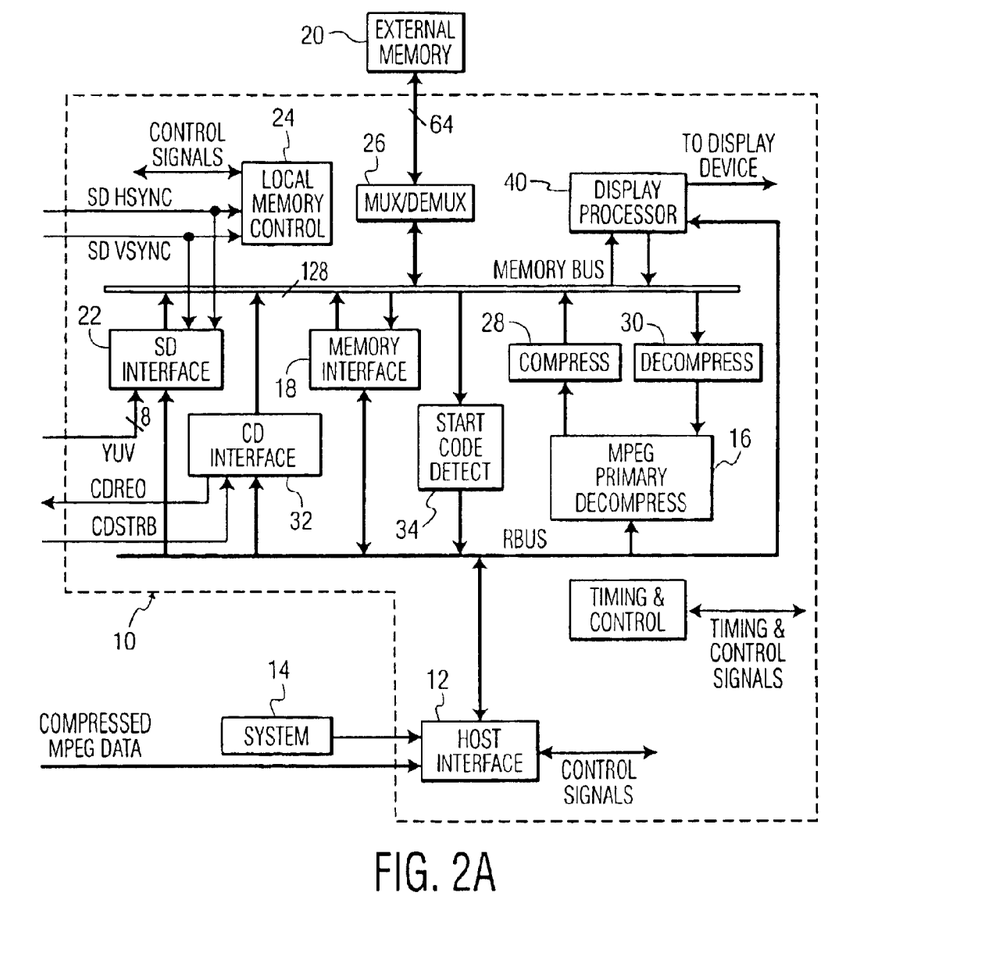
FIG. 2A is a block diagram of an SD/HDTV MPEG2 decoder and display processing circuit employing the present invention.

FIG. 2A shows a block diagram of a portion of a compressed video signal decoder including display processing circuitry for transforming signals occurring in different formats to a preferred format or formats. All of the illustrated circuitry, except possibly the external memory and the system control, may be included in a single integrated circuit or not, depending on the requirements of a particular system. The apparatus in FIG. 2A may be included in, for example, an Advanced Television Receiver (ATV), including Tuner/IF circuitry, circuitry, Error Correction circuitry, and Inverse Transport circuitry for providing, e.g., an MPEG2 compressed digital video signal. The FIG. 2A apparatus assumes that the television receiver will provide, e.g., decoded NTSC, PAL or SECAM signals (all referred to as SD) in a digital format such as CCIR601. In addition, the FIG. 2A apparatus receives and decodes compressed video signals from other sources which may transmit at constant and variable rates, both continuously and in bursts. Other data formats may be input to decoder 10 by adding a converter to provide the signal in an acceptable format. Such data formats may be those known in the computer industry, RGB, VGA, SVGA, etc., for example.

Decoder 10 includes an input interface 12 which couples external compressed video data other than SD video data to the decoder. For example, input interface 12 is coupled to an overall system controller 14, to an MPEG2 primary decompressor 16 and to a memory interface 18. Input interface 12 couples external data and control signals to various parts of decoder 10 through an RBUS which is 21 bits wide in this example. The compressed video data are retrieved from MPEG2 formatted packets and buffered in external memory 20 prior to decompression.

Non-MPEG2, standard definition digital video is applied directly from an external source to an SD interface 22 via an 8-bit bus. SD data are received in a digital raster line format, i.e. line-by-line. SD interface 22 operates in conjunction with LMC 24 (local memory controller), passing the SD data to external memory 20 as pixel block data compatible with the input requirements of a display processor 40. Since the SD data are line formatted pixel representations, the pixel data are simply reorganized by position into pixel blocks as it is written into memory 20. Converting SD data to pixel blocks advantageously allows both SD data and decompressed MPEG2 data to be processed by the same display processor.

SD interface 22 is simpler and less costly than bypassing display processor 40 or providing a second compatible display processor. Bypassing requires reprogramming and reconfiguring many of the elements in display processor 40 to handle when SD data is received, because pixel block data is not processed the same as raster line data. SD interface 22 is an uncomplicated element which handles certain tasks. These tasks include receiving and counting the number of pixels per line, ensuring the correct amount or information is always output to external memory 20, and not outputting data during blanking periods. Furthermore, LMC 24 requires only a simple algorithm to direct the reorganization of data received by SD interface 22.

FIG. 3 illustrates one example of data reorganization from line form to block form. Generally, data received by SD Interface 22 is in digital form. However, a converter (not shown) may easily be added at or prior to the input of SD Interface 22 to convert the data to digital form when necessary. Rows A through L represent pixel data having 4:2:2 aspect ratio and raster line format. The data rows continue according to the received data format. SD Interface 22 reorganizes the data by separating luminance and U and V chrominance values. Luminance data are grouped in 8×8 blocks and U and V chrominance data are grouped into 4×4 blocks. The chrominance data blocks include odd data positions in the U block and even positions in the V block. Also, conversion from a 4:2:2 to a 4:2:0 aspect ratio occurred during the reorganization, however aspect ratio conversion will depend upon the display device input data requirements. The reorganized data is stored as blocks in external memory 20.

Compressed data which may only appear once, which may be received at a variable rate, or which may be received in bursts are received by decoder 10 on a priority CD (compressed data) interface 32. When data are present at CD interface 32, decoder 10 prioritizes the interface activity to ensure proper reception. CD interface 32 accepts compressed video data in MPEG2 compatible format. CD interface 32 includes a buffer with an 8-bit input and a 128-bit output which translates the data and sends it to external memory 20 prior to decompression.

External memory 20 also connects externally to decoder 10, and may be as large as 128 Mbits for high definition television signals. The connection is a 64-bit bus coupled through a multiplexer/demultiplexer 26. Unit 26 translates data from a 128-bit internal memory data bus (MEM BUS) to the 64-bit memory bus. LMC 24 controls read/write of external memory 20 at the request of the various interfaces and the various processing circuitry. LMC 24 is programmed to store video data in memory 20 in block format, where a block comports with an MPEG2 structured block of 8×8 pixel data.

Decoder 10 uses external frame memory 20 as a receiving and timing buffer for compressed video data because of its storage capacity. A large storage space is needed to buffer incoming data prior to decompression. Putting this buffer in an integrated circuit disadvantageously occupies significant physical space. Also, buffering facilitates pixel block formation for frame reconstruction. Overhead information is retrieved by start code detector 34 which obtains information needed for decompression.

Compressed input video data is retrieved from external memory 20 for initial decompression and applied via the MEM BUS to MPEG2 decompressor 16. Other forms of decompression may be utilized without affecting the spirit the present invention. MPEG2 decompression of predicted frames requires that previously decompressed "anchor" frames be stored in memory and retrieved when needed to decompress and reconstruct an image. The apparatus of FIG. 2A preferably incorporates secondary compression of decompressed MPEG2 video data before complete frames are stored in memory 20, thereby significantly reducing the amount of external memory required in the receiver. Secondary compression is hereinafter referred to as recompression.

Figure 2B:
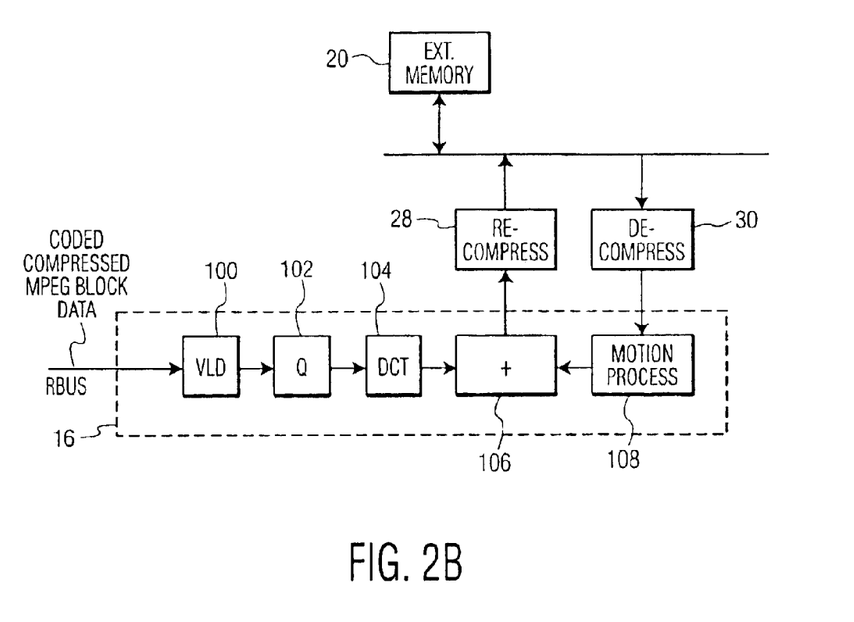
FIG. 2B is a block diagram showing an embodiment of an MPEG2 decompressor as used in FIG. 2A.

The first compression, and subsequent decompression, is the formatting of data in MPEG2 format for broadcast in a transport stream. FIG. 2B is an example of an MPEG2 decompressor. Decompressor 16 of FIG. 2A is expanded to show the necessary generic element an MPEG2 decompressor. Coded, compressed MPEG2 data is received on RBUS by VLD (variable length decoder) 100. VLD 100 passes decoded data to inverse quantizer 102, which passes unquantized data to inverse discrete transform processor 104 which produces MPEG2 decompressed block-based data. This data is combined with data from motion processor 108 in combiner 106 and passed to recompressor 28.

Recompressor 28 is different from MPEG2 compression in an MPEG2 encoder, and may be practiced in many forms. For example the recompression may include differential pulse code modulation on a block basis and subsequent fixed, variable, or run length coding. Alternatively it may incorporate Huffman coding on a block basis. Compression may be lossless or lossy.

Recompression is performed in FIG. 2A by a compressor 28 coupled between MPEG2 decompressor 16 and the MEM BUS. Thus, MPEG2 decoded and decompressed video data are applied to compressor 28 for data recompression followed by storage in external memory 20. When recompressed video data are retrieved for reconstructing MPEG2 predicted frames in a motion processing network, they are first applied to a decompressor 30, which operates inversely to compressor 28. The retrieved data, after passing through decompressor 30, is in condition for use by MPEG2 decoder 10 for reconstructing predicted frames in the course of motion compensation processing.

Figure 2C:
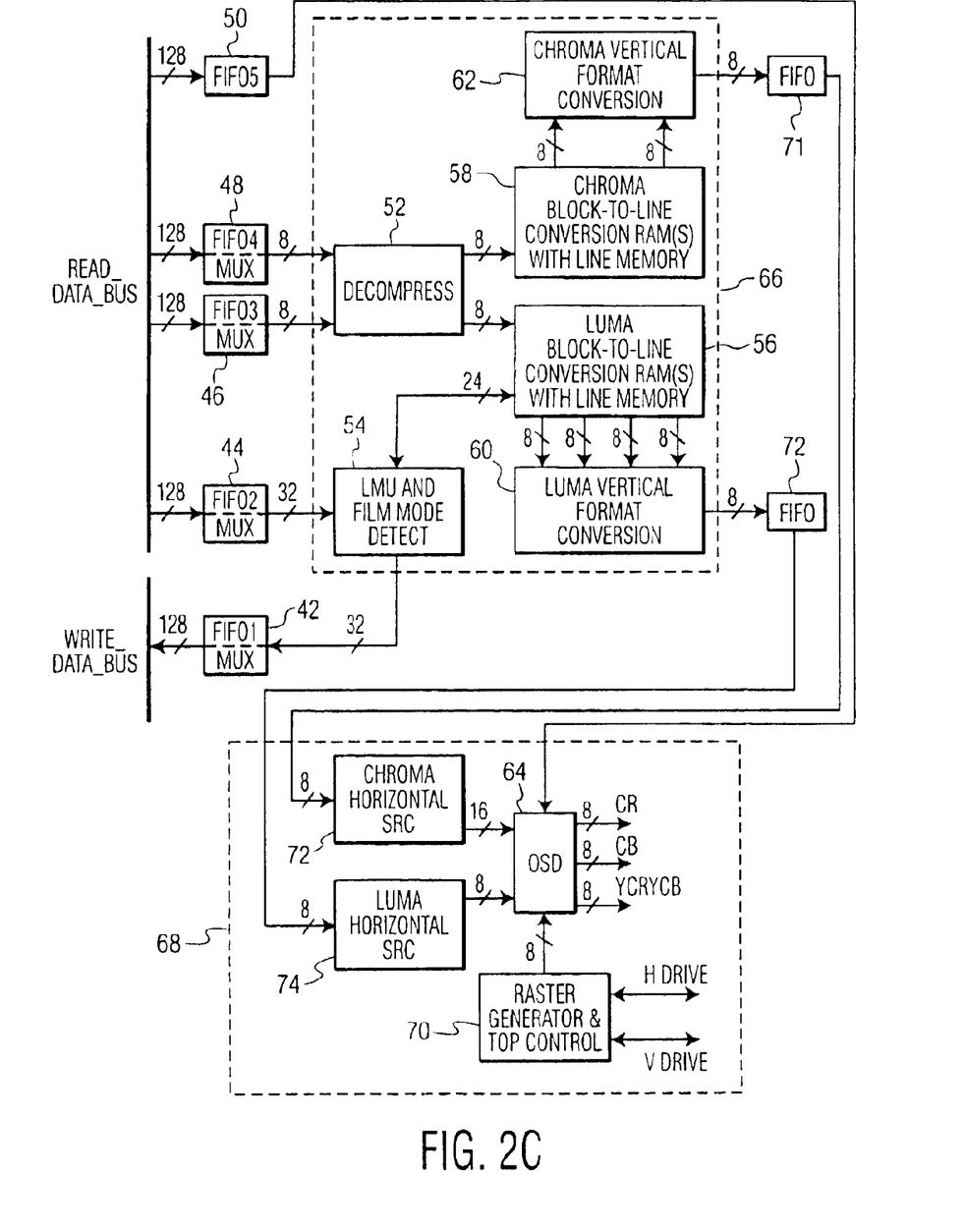
FIG. 2C is a block diagram of the display processor of FIG. 2A.

Both HD recompressed video frames and SD video frames are retrieved from external memory 20 and applied to display processor 40 via the MEM BUS for processing prior to display or storage as component signals with a desired aspect ratio and display resolution, as is shown in FIG. 2C. Data retrieved from external memory 20 is applied to display processor 40 through FIFO's 42, 44, 46, 48, 50 which perform two functions. The first is time buffering of the data. The second is converting sixteen-byte wide data (128 bits) from the MEM BUS, to one-byte wide data (MPEG2 data to decompressor 52) or to four-byte wide data (SD data to LMU 54). The designated byte widths are exemplary.

Display processor 40 is shown in FIG. 2C. In display processor 40, recompressed MPEG2 video data is first applied to decompressor 52, which is similar to decompressor 30. Decompressor 52 provides decompressed video luminance (Y) and chrominance (C) video component signals on a block-by-block basis. Decompressed MPEG2 component signals from decompressor 52 are applied to respective luminance and chrominance block-to-line converters 56 and 58. The block-to-line converters apply Y and C component signals on a line-by-line basis to a luma vertical format converter (LUMA VFC 60) and a to chroma vertical format converter (CHROMA VFC 62) respectively. Both luma and chroma rate converters 60, 62 include circuitry for vertical format conversion and horizontal sample rate conversion. Vertical and horizontal converters are separated by FIFO's to handle timing transitions between the converters.

The sample rate converters are programmable in accordance with the parameters of a particular system, and may increase or decrease the number of lines per picture, and/or increase the number of pixels per line. Luma and chroma component data from the sample rate converters are coupled to an on-screen display (OSD 64) which is selectively conditioned as known to overlay text and/or graphics on the component video signals. Either system controller 14 or the input data stream may provide OSD data which is stored in external memory 20, though not on a block basis.

Decoder 10 advantageously includes circuitry for deinterlacing SD picture formats and a 480 (active) line progressive scan output. This circuitry is located in LMU 54. The SD picture format has 480 active interlace scan lines. To provide the appearance of higher vertical resolution for display on a high resolution monitor, the output is increased to 480 active progressive lines.

LMU 54 (Linear Motion-adaptive Upconverter) performs the line conversion required by the output image display device and caused by interlacing fields from an image frame. The SD signal is stored in and subsequently retrieved from external memory 20 because LMU 54 requires an SD signal concurrently from adjacent fields to calculate image motion and generate a progressive scan output at the same or at a higher resolution. This is not motion compensation as it is known in an MPEG2 format. For each field, associated lines pass through LMU 54, which estimates lines interstitial to field lines based upon the amount of image motion. Image motion is estimated from differences between corresponding pixel values in previous and subsequent fields. If motion values are generally zero, then the average of the line from previous and subsequent fields is used as the estimated line. If a high degree of motion exists for the pixel being estimated, then the pixel value is estimated from the average of the line above and the line below the interstitial line in the current field. If only a small degree of motion exists, then the interstitial line is estimated from a combination of the line in the previous field and averaged lines from the current field. The more motion present, the more the average of the lines above and below the current line from the current field is used relative to the interlace scan line from the adjoining fields. Rather than constrain memory 20 to provide adjacent lines for line averaging, memory internal to luma block-to-line converter 60 is advantageously utilized to concurrently provide video signal from adjacent lines to LMU 54. However, only the preceding or following line is available from the line memories in converter 60. Furthermore, LMU 54 may clarify frames with filters and line and/or field delays based upon motion occurring within the frame.

The LMU 54 requires memory to process SD data because an image frame is presented in two interlaced fields which must be temporally processed to correctly reconstruct motion information from the original image. Processing can not be completed until adjacent lines from both fields are available. An image field for SD data is approximately 240 active lines. Rather than provide additional internal memory for this function as was previously done, data being processed may be stored in and retrieved from memory 20. A sufficient portion of memory 20 is available because it is not being fully utilized as it would be for processing HD data (described above). By directing data from LMU 54 to memory 20, rather than providing local memories in the display processor integrated circuit, the size and cost of the integrated circuit is reduced. Because of the existing memory buses READ DATA BUS and WRITE DATA BUS, and firmware associated with LMU 24, transfer to memory 20 is fast and efficient.

Data may be applied to and from the MEM BUS via FIFO memories internal to processing elements (not shown to simplify the drawing). Elements of FIG. 2A have input and/or output FIFO's which allow decoder 10 to function in a seamless manner. By loading a segment of data into the buffers/FIFO's, each element may access the MEM BUS as it becomes available, while maintaining a steady data flow within the processing element.

The display processor has two separate clocks controlling separate sections, the decompress clock domain 66 and the display clock domain 68, as is seen in FIG. 2C. The decompress clock domain 66 contains all the functions which must interface synchronously with block-to-line conversion RAM's 56, 58, and runs at 40 to 81 MHz clock rates to achieve the desired bandwidth. Display clock domain 68 contains functions which runs synchronously with the final output at clock rates from 27 to 81 MHz. The two clocks may operate at the same rate or at a different rate, depending upon the application. Video data passing between the two clock domains passes through FIFO's 71, 73 (one each for luma and chroma) with the read request for the FIFO's coming from the horizontal sample rate converter controller.

Each FIFO includes control logic responsive to read and write acknowledge and request signals from display processor 40 and LMC 24. Control logic also exists to track the amount of data in the respective FIFO, and to control the asynchronous interface between the "bus" end of the FIFO, which uses the same clock as the data bus, and the "display" end of the FIFO which uses the decompress clock. Since the display section contains the control logic, the amount of circuitry actually operating off the "bus" clock is desirably minimized.

The primary or MPEG2 decompressed data (but secondarily recompressed data) is accessed from external memory 20 on a block by block basis, and applied via FIFO3 46 and FIFO4 48 to luma and chroma secondary decompressors which provide decompressed luma and chroma pixel block values. The blocks of decompressed luma and chroma pixel values are applied to respective block-to-line converters 56 and 58 comprising local RAM memories. Entire rows of 8×8 blocks (luma) or 4×4 blocks (chroma) are written to the respective local memories. The memories are read out line by line or by multiple lines in parallel depending on the instant function of converter circuitry connected to the memory output memory. As data is read, new data is written into that location to minimize the amount of local memory required. Exemplary sizes for local memories of block to line converters 56 and 58 are 16 bytes wide by 960 words deep and 16 bytes wide by 720 words deep. Local memories include input multiplexers and output multiplexers to arrange the input data into 16 byte wide data for storage in the local memory, and to appropriately arrange the 16 byte wide data read from memory for use by the respective vertical sample rate converter.

The horizontal and vertical sample rate converters for processing decompressed MPEG2 video to be displayed on a high definition 16:9 display will perform the line conversions listed in tables I and II respectively. The horizontal converter should be capable of a maximum pixel output rate of 81 MHz.

TABLE I

HORIZONTAL CONVERSIONS

| INPUT FORMAT | OUTPUT FORMAT |
|---|---|
| 352, 480, 544, 640, 720, 1280, 1920 | 1920 |
| 352, 480, 544, 640, 720, 960 | 960 |
| 352, 480, 544, 640, 720, | 720 |

TABLE II

VERTICAL CONVERSIONS

| INPUT FORMAT | OUTPUT FORMAT |
|---|---|
| 720 Progressive | 480 Interlace, 540 Progressive, 1080 Interlace |
| 1080 Interlace | 480 Interlace |
| 240 CIF | 480 Interlace, 540 Progressive, 1080 Interlace |
| 480 Interlace | 540 Progressive |

Tables I and II describes luma signal conversions. Similar conversions are performed on chroma signals. Regarding chroma, the compressed signal is in 4:2:0 format, and the foregoing chroma conversions include an additional conversion from 4:2:0 to 4:2:2. Usually this chroma processing will be included with any other required vertical processing. For vertical chroma conversion, a two-tap polyphase filter is generally employed for the combined resampling and the 4:2:0 to 4:2:2 conversion.

For FIGS. 4 through 8 it may appear that the X's and O's are not aligned or incorrectly overlap. Whereas the figures do approximate the placement, the general relationship of X to O is correct. The apparent misalignment or overlap is correct and occurs because of the noninteger ratio of the conversion.

Figure 4:
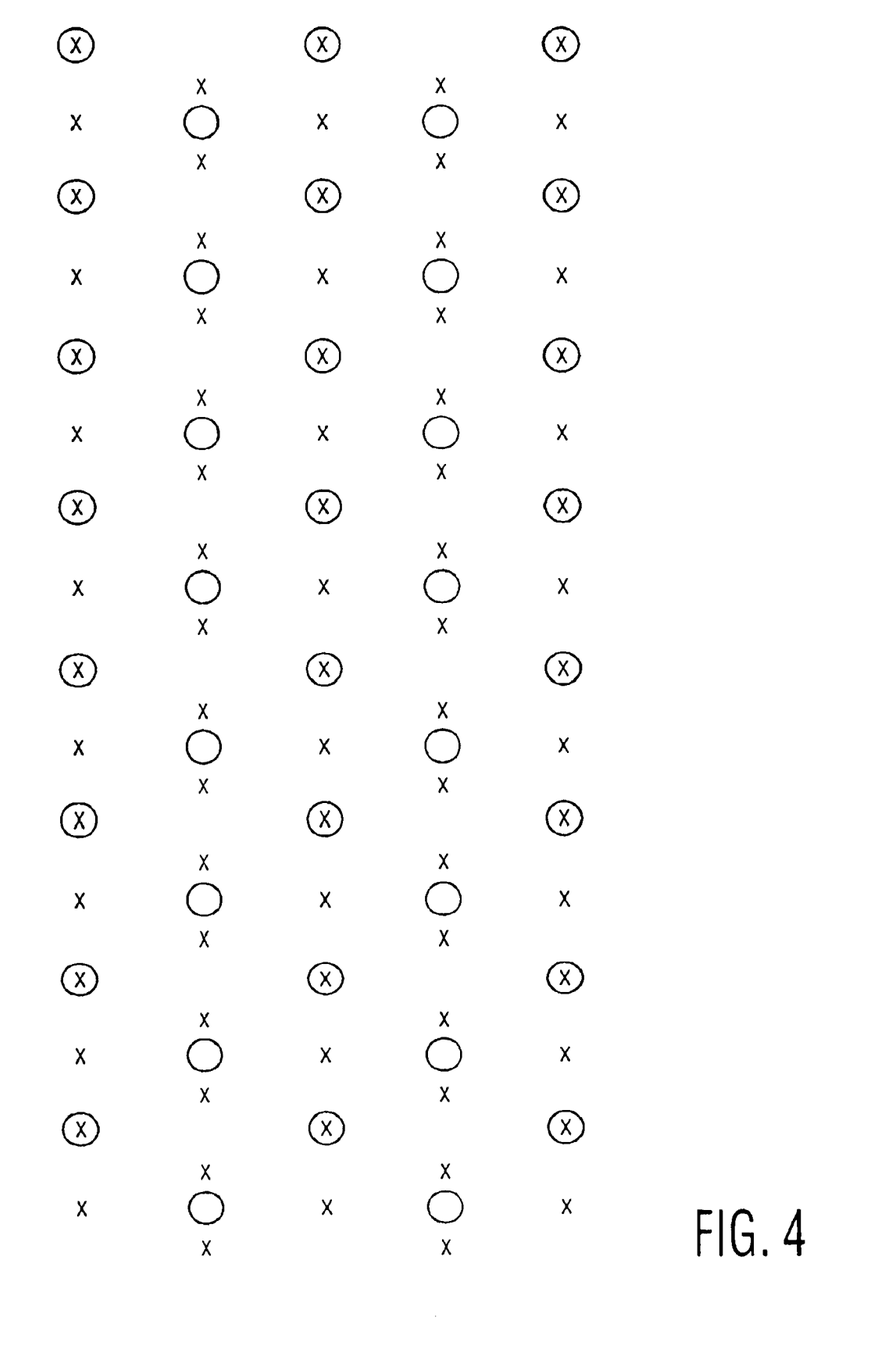

FIG. 4 illustrates pictorially the vertical/temporal relationship of input and output chrominance lines when 4:2:0 to 4:2:2 only conversion is required (i.e. receive 480 progressive and display 480 interlace or receive 1080 progressive and display 1080 interlace). FIG. 4 represents a portion of the lines in a field. The circles represent the original pixels in 4:2:0 format. The "X's" represent pixels of the converted 4:2:2 signal. Interpolated lines in every field are calculated from the lines in the respective field. FIG. 4 shows a field based display. In this case, the even chroma lines (starting with line 0) are used to generate the first or top field, and the odd chroma lines are used to generate the second or bottom field.

Figure 5A:
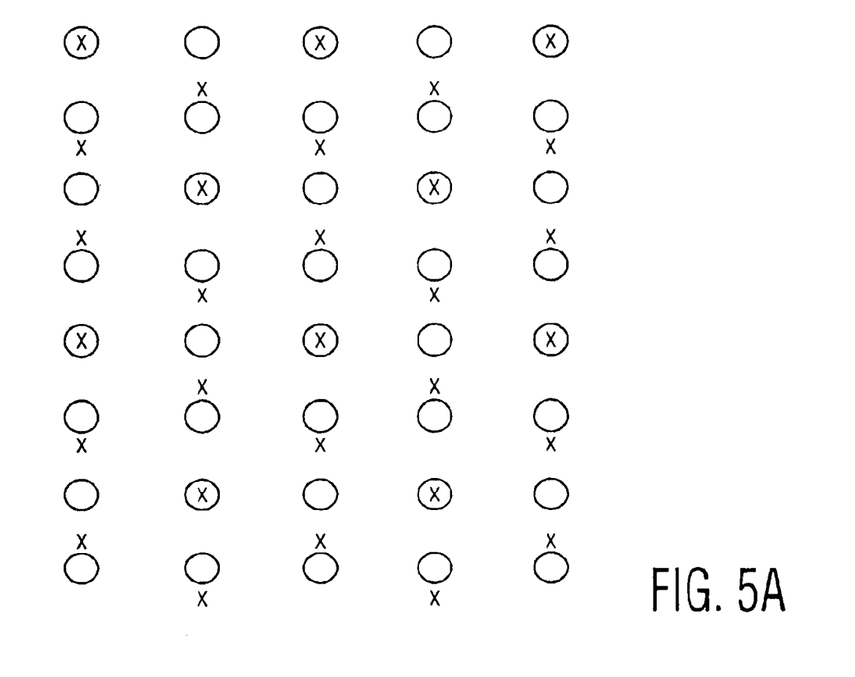
Figure 6A:
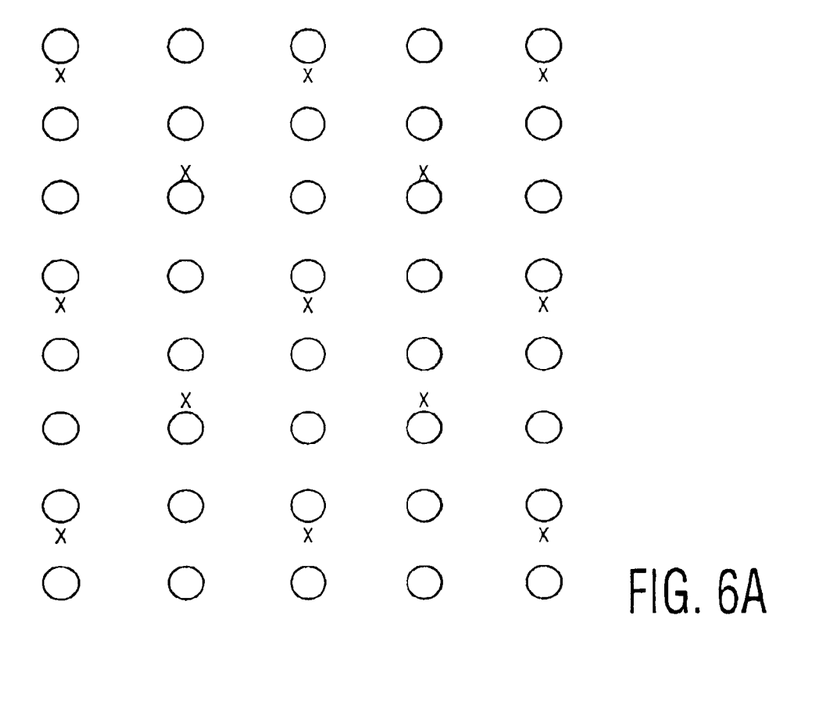

FIGS. 5A and 6A illustrate luma conversion options in a form similar to that described with respect to FIG. 2A. FIG. 5A illustrates the vertical and temporal relationship of input and output luma lines when 720 progressive format is converted to 1080 interlace format.

FIG. 6A illustrates the vertical and temporal relationship of input and output luma lines when 720 progressive format is converted to 480 interlace format.

Figure 5B:
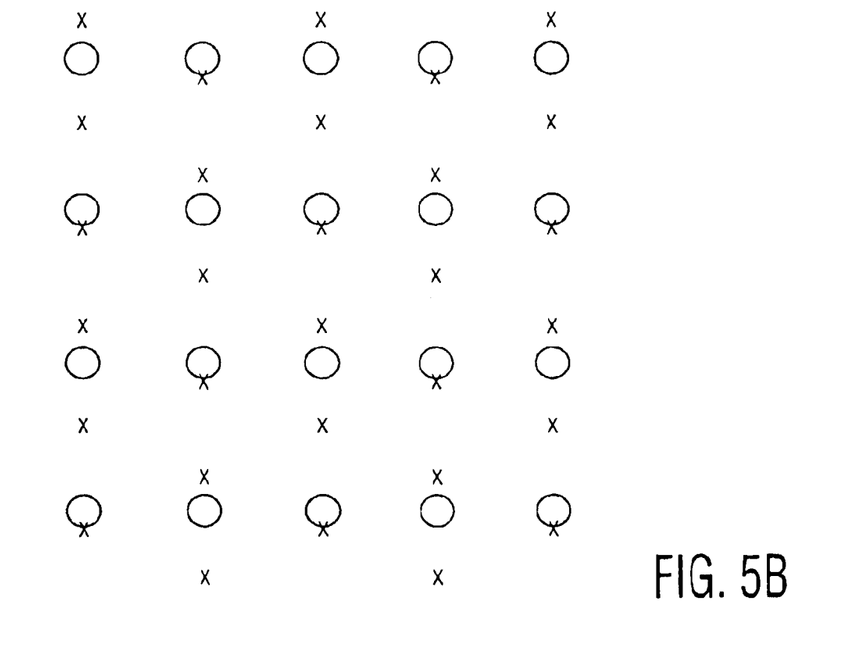
Figure 6B:
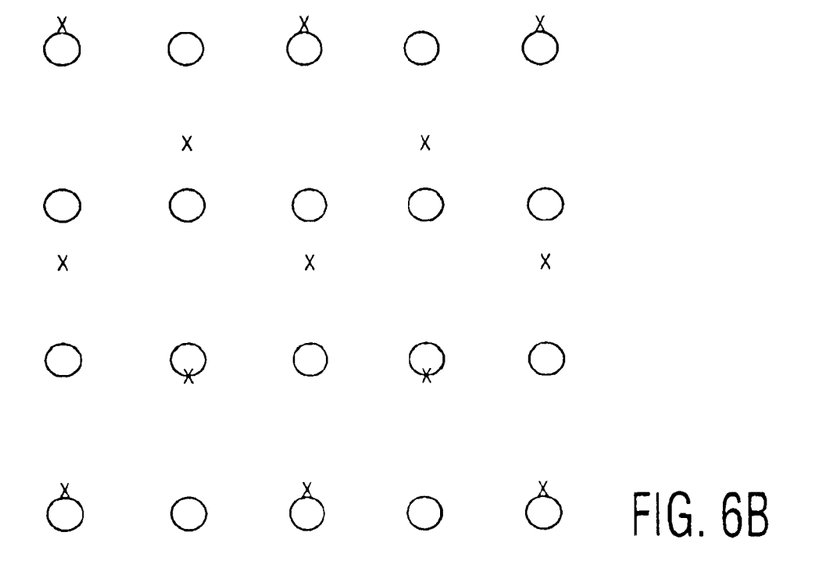

FIGS. 5B and 6B illustrate corresponding chroma conversion options relative to the luma conversions described above. FIG. 5B shows the vertical and temporal relationship of input and output chroma lines when 720 progressive format is converted to 1080 interlace format. FIG. 6B shows the vertical and temporal relationship of input and output chroma lines when 720 progressive format is converted to 480 interlace format.

No temporal processing is included in these exemplary conversions. Luma and chroma processing occurs only in the vertical direction. Furthermore, the input chroma information is frame based and only frame based 4:2:0 to 4:2:2 conversion need be considered.

Figure 7A:
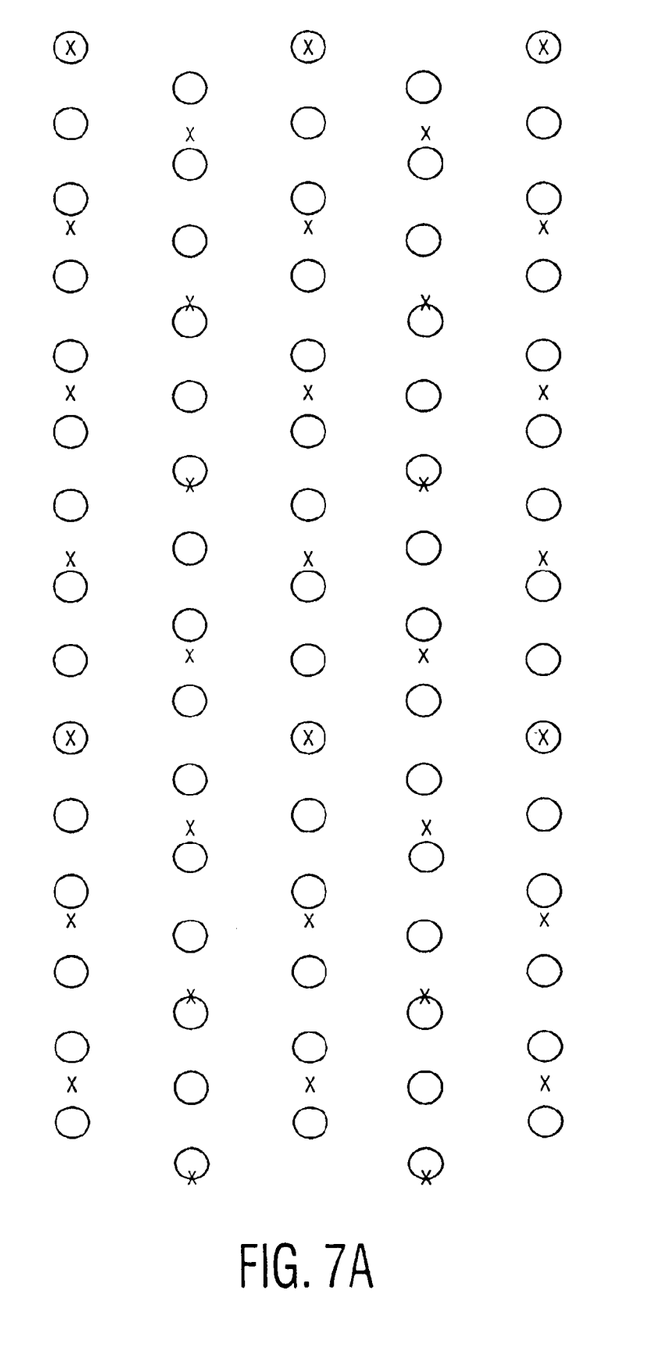
Figure 7B:
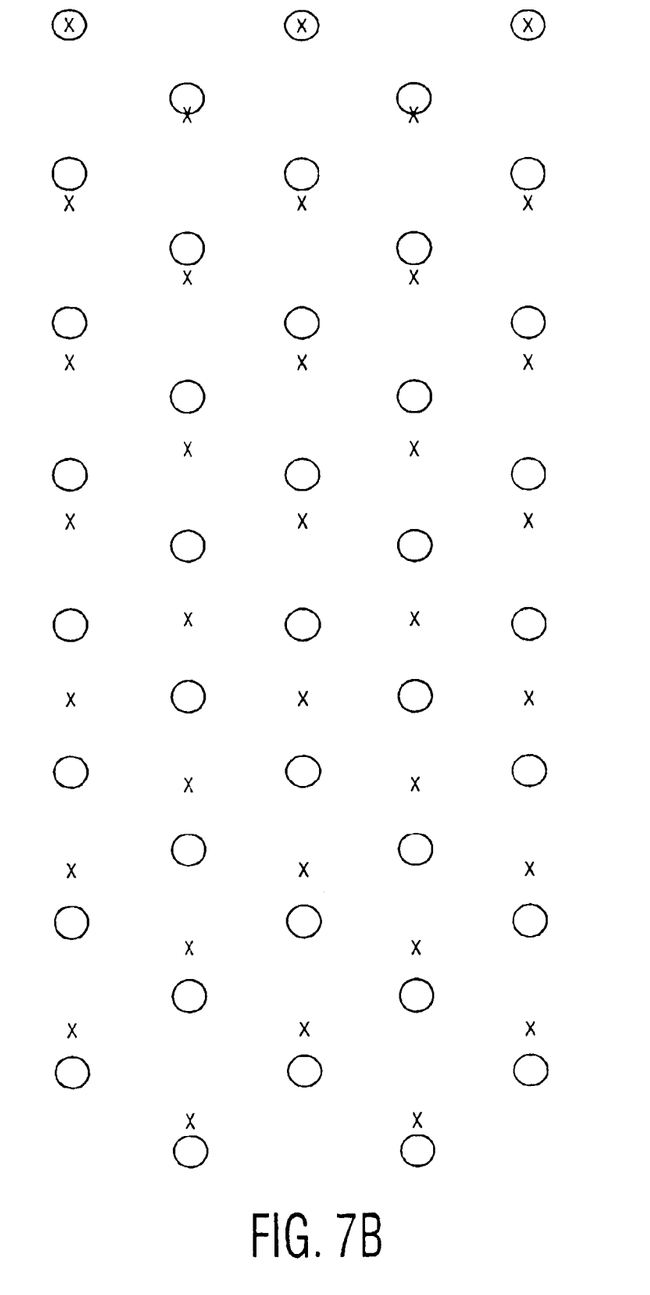

FIGS. 7A and 7B are different. FIG. 7A shows the vertical and temporal relationship of input and output luminance lines when 1080 interlaced format is converted to 480 interlace format. FIG. 7B shows the vertical and temporal relationship of input and output chrominance lines when 1080 interlaced format is converted to 480 interlaced format.

Figure 8A:
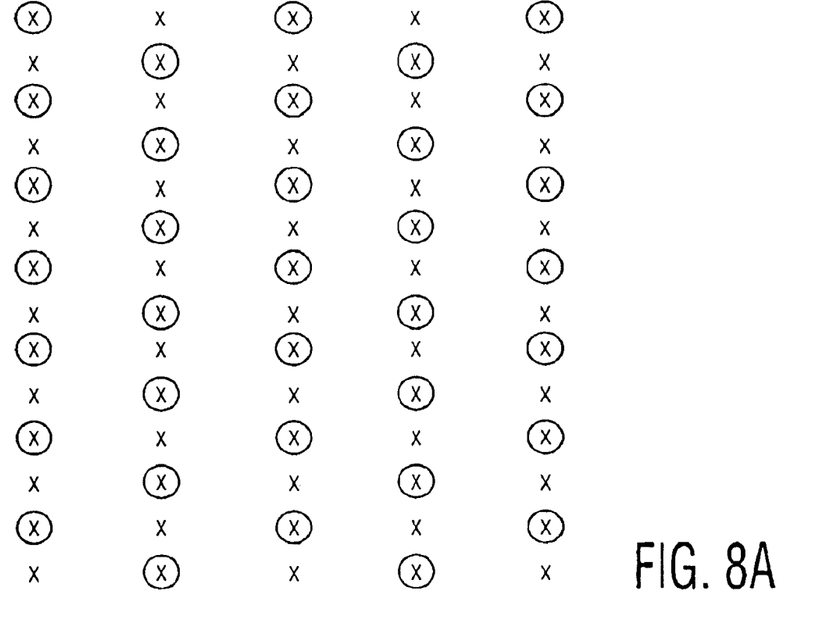
Figure 8B:
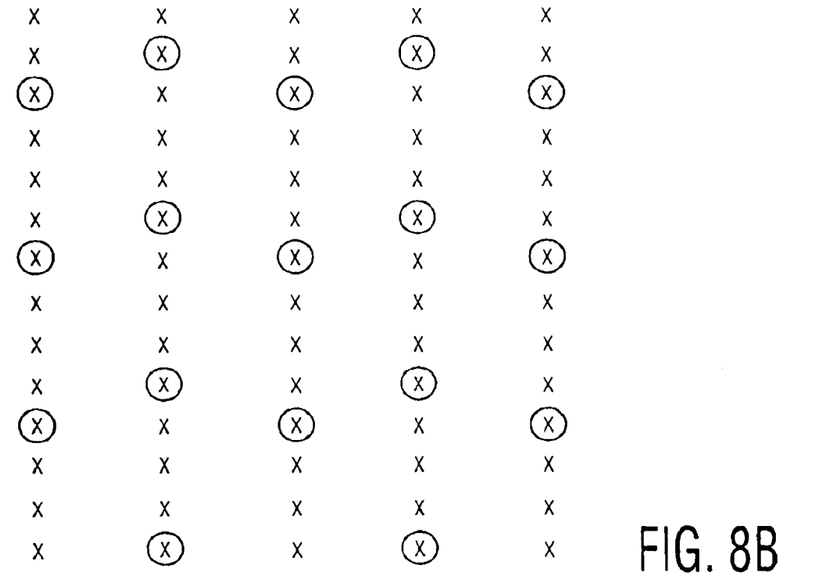

FIGS. 8A and 8B pictorially illustrate the luminance and chrominance vertical conversions, respectively, of SD video signal performed by LMU 54. Recall that vertical and temporal processing is included in these conversions rather than vertical only processing. Typically, operation of the deinterlacing algorithm is only required for image sizes up to 720×480 interlaced (i.e. CCIR601 resolution). These images can originate from the MPEG2 decoding process or as input from the SD input port.

Figure 9:
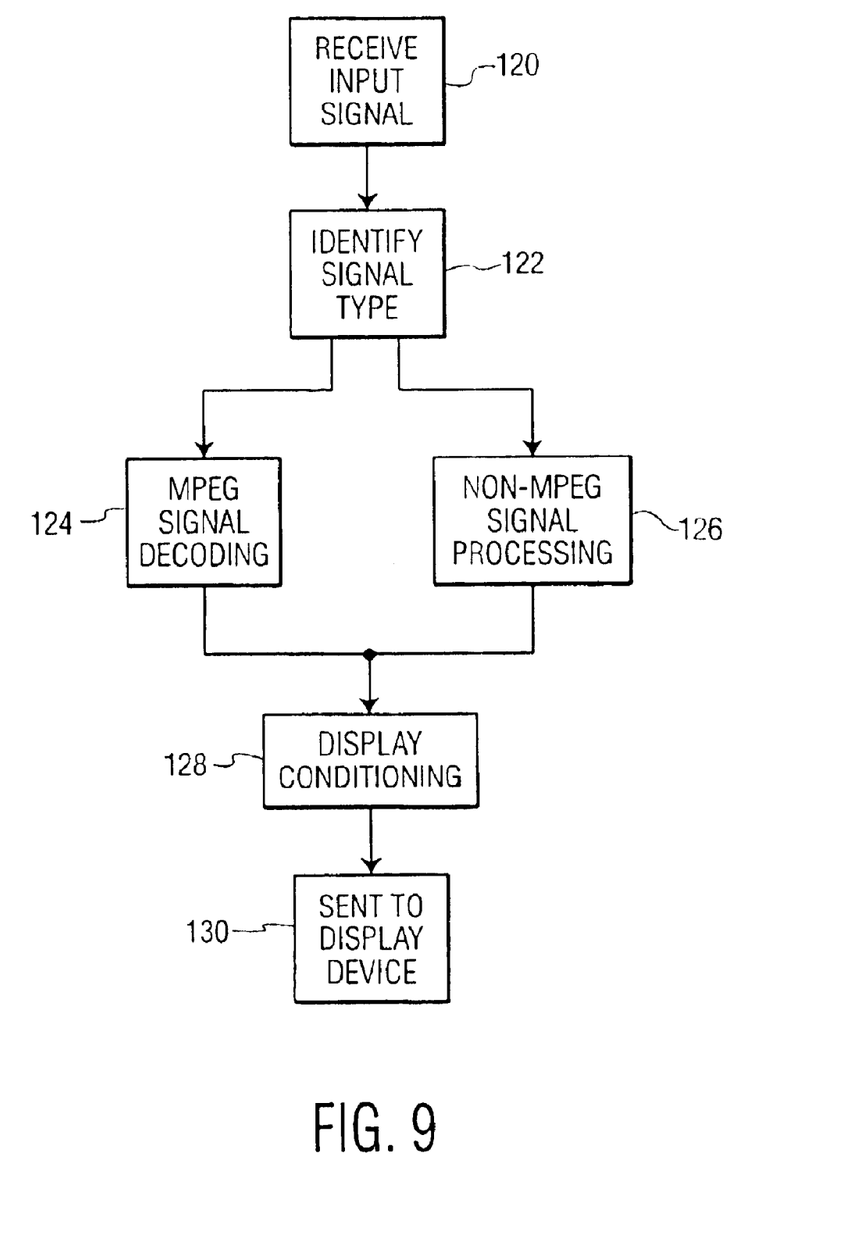
FIG. 9 is a flow chart of the signal path through a receiver including a decoder according to the present invention.

FIG. 9 is a flow chart of the signal path through a receiver including a decoder according to the principles of the present invention. The input signal is received by the receiver in block 120. The input signal is formatted as an MPEG2 or non-MPEG2 compatible signal as described above. The signal format is identified in block 122 and the identified signal is directed to the proper processing path. If the signal format is MPEG2 compatible, the signal is decoded in block 124 as described above, and block data compatible with the display processor is produced and stored in memory 20. If the signal is not MPEG2 compatible, the signal is processed and stored in memory 20 in block 126 as described above. This data is also block data compatible with the display processor 40 in FIG. 1. The display processor compatible block data is passed to display processor 40 from memory 20. Block 128 produces data formatted which is compatible with a particular display device, or another storage device. Data requiring a higher resolution is transferred between display processor 40 and memory 20 during such processing. Finally, the display compatible data is sent to the display device (or storage medium) in block 130.

The common architecture which is disclosed above is useful for storing field and frame image information in memory 20 during other standard definition data processing as well when memory 20 is not being otherwise used. For example, standard definition data often is filtered by a comb filter which may employ sufficient memory to store an image field or frame. This memory is generally separate from memory used for other functions. By utilizing the common structure described above, frame memory may be used thereby saving on design and implementation costs. On screen display may also use memory 20 in a similar manner to eliminate the need for separate memory.

What is claimed is:

1. A digital processor having common architecture for processing multiple format video signals, comprising:
   an input network for receiving high definition formatted video data and standard definition formatted video data;
   a decoder coupled to said input network for producing high definition decoded and decompressed data;
   a converter coupled to said input network for converting said standard definition formatted data to a format compatible with said high definition formatted data;
   a common memory for storing high definition and standard definition formatted data during processing by said processor; and
   a display processor for processing said high definition formatted data and said converted standard definition formatted data for display.

2. The processor of claim 1, wherein:
   said decoded and decompressed high definition data is in a block format;
   said high definition data is MPEG2 compatible;
   said display processor accepts video data in a block format; and
   said converter converts said standard definition data to block format.

3. The processor of claim 1, wherein:
   said input network receives burst compressed data.

4. The processor of claim 1, wherein:
   said memory receives block-based data, and field and fame data in raster format.

5. The processor of claim 2, further comprising:
   a recompressor for recompressing said decoded and decompressed MPEG2 data prior to storage in said memory.

6. The processor of claim 1, wherein:
   said display processor is programmable to provide an output video data format compatible with a display device coupled to said display processor.

7. The processor of claim 1, wherein
   said input network includes an input for receiving MPEG2 format data and an input for receiving non-MPEG2 format data;
   said display processor includes a block-to-line converter for processing block format MPEG2 data and line-to-block converted non-MPEG2 format data; and
   said common memory stores said MPEG2 format data and said non-MPEG2 format data during processing by said system.

8. The system of claim 7; wherein:
   said memory receives block-based data, and field and frame data in raster format.

9. The processor of claim 1, comprising
   a first processing path, associated with said input network, comprising an input for receiving MPEG2 format information, an MPEG2 decoder corresponding to said decoder, and said display processor having an output for conveying image information to a display device;
   a second processing path, associated with said input network, comprising an input for receiving standard definition format information, a line-to-block converter and said display processor;
   switching means for selectively conveying display information to said display output via said first and said second processing paths; and wherein
   said common memory is block based and is coupled to said first and said second processing paths;
   said display processor includes means for changing the resolution of said standard definition format information; and
   said switching means stores said standard definition format information in said memory during processing.

10. A system according to claim 9, wherein:
    said memory receives block-based data, and field and frame data in raster format.

11. A method for processing multiple format video signals, comprising the steps of:
    receiving a signal comprising data to be processed
    identifying said received signal as one of MPEG2 format signal and standard definition format signal
    decoding input MPEG2 format signal to produce block format data when received
    pre-processing input standard definition format signal to produce block format data when received
    conditioning said conveyed data to a format suitable for display
    storing said MPEG2 format data and said standard definition format data in a common memory during processing; and
    conveying display conditioned data to a display device.

12. A method according to claim 11, wherein:
    said pre-processing step converts line format data or block format data.

13. A method according to claim 11, wherein:
    said conditioning step converts block format data to line format data.

14. A method according to claim 11, wherein:
    said memory receives block-based data, and field and frame data in raster format.

* * * * *